United States Patent [19]

Wallis

[11] 4,005,763
[45] Feb. 1, 1977

[54] LUBRICATING MEANS FOR GAS-OPERATED CYLINDERS

[76] Inventor: Bernard J. Wallis, 25200 Trowbridge Ave., Dearborn, Mich. 48124

[22] Filed: Mar. 19, 1975

[21] Appl. No.: 559,660

[52] U.S. Cl. .................................. 184/24; 92/153; 184/55 A; 267/119
[51] Int. Cl.² ........................................ F16N 1/00
[58] Field of Search ................. 184/24, 18, 19, 20, 184/6.8, 5, 29, 32, 55 A; 92/153, 154, 155, 156, 157, 158, 159, 160, 78; 267/118, 119; 277/17, 19

[56] References Cited

UNITED STATES PATENTS

| 271,238 | 1/1883 | Heston | 184/29 |
|---|---|---|---|
| 1,014,744 | 1/1912 | Bavier | 92/159 X |
| 1,228,335 | 5/1917 | McClelland | 184/29 |
| 1,228,336 | 5/1917 | McClelland | 184/29 |
| 1,664,485 | 4/1928 | Rode | 267/119 |
| 1,856,372 | 5/1932 | Buchet | 184/29 UX |
| 3,204,536 | 9/1965 | Taylor | 92/155 |

FOREIGN PATENTS OR APPLICATIONS

| 317,263 | 8/1929 | United Kingdom | 184/18 |
|---|---|---|---|
| 215,668 | 6/1968 | U.S.S.R. | 184/6.8 |

Primary Examiner—Richard J. Apley
Assistant Examiner—Arnold W. Kramer
Attorney, Agent, or Firm—Barnes, Kisselle, Raisch & Choate

[57] ABSTRACT

Lubricating means for a piston-cylinder unit operated by non-lubricated gas under pressure comprising a passageway in the piston-cylinder unit extending from the surrounding atmosphere to the cylinder chamber on the side of the piston opposite that to which the pressurized gas is directed. A lubricant-impregnated material is located in the passageway so that, as air flows into said chamber in response to movement of the piston in the cylinder, the lubricant is entrained in the air and is carried into the cylinder to lubricate the contacting surfaces of the piston and cylinder. In addition, a lubricant-impregnated wick is arranged within the piston rod and contacts the conventionally used lubricant-impregnated felt ring on the piston to prolong the supply of lubricant to the ring.

30 Claims, 8 Drawing Figures

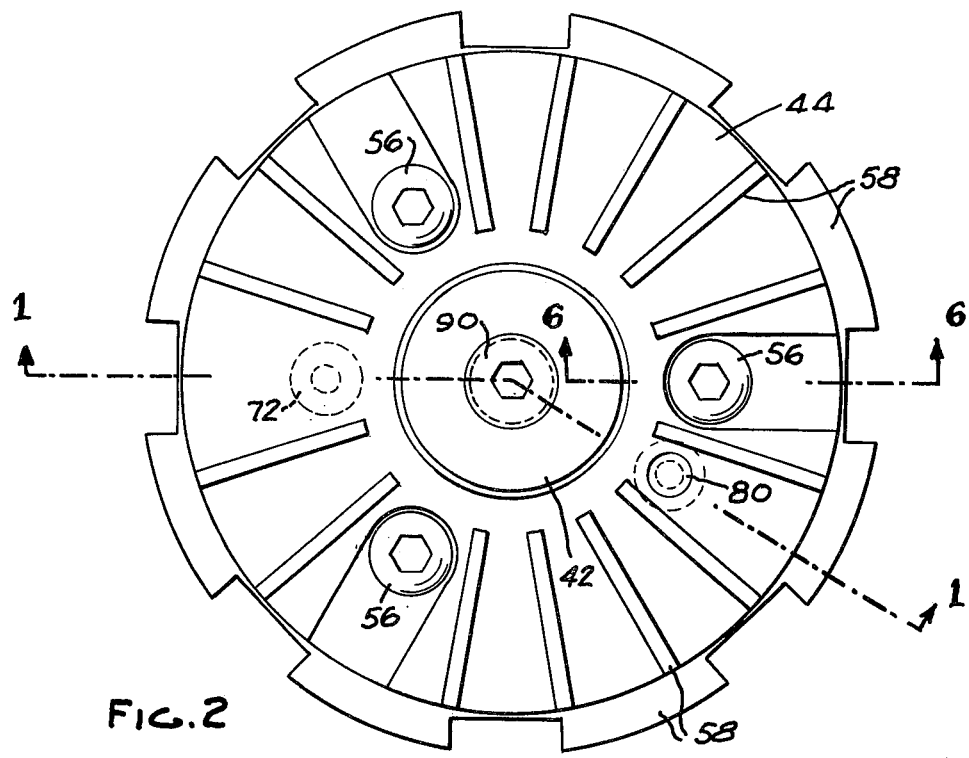
FIG. 2
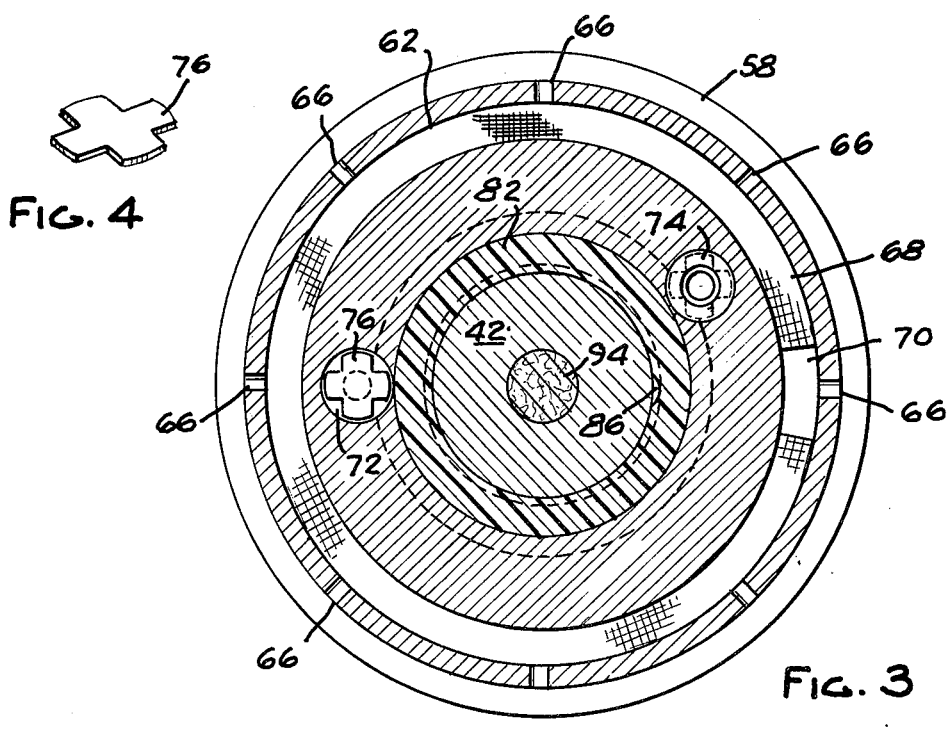
FIG. 4
FIG. 3

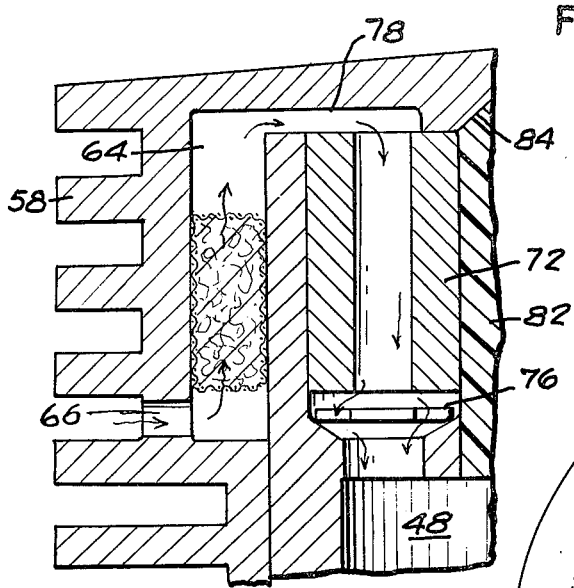
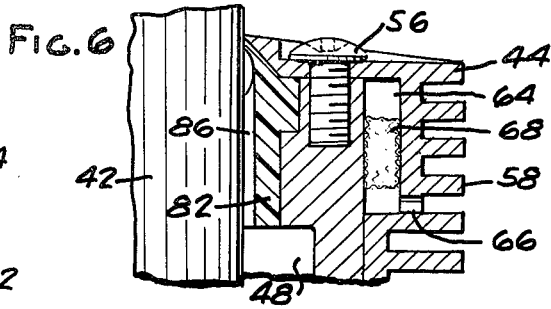
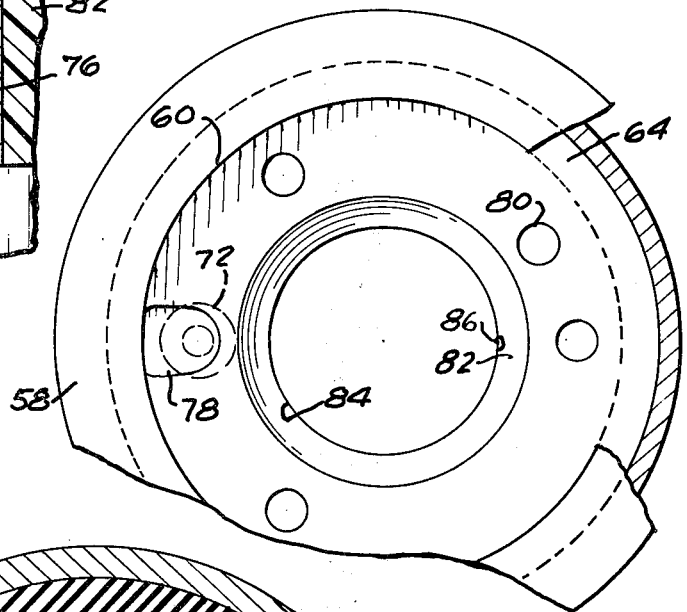
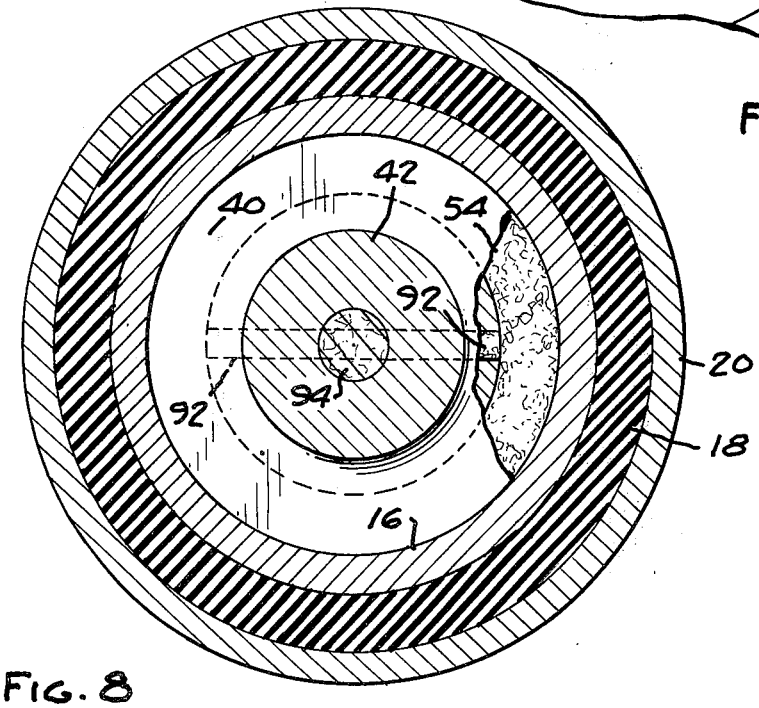

LUBRICATING MEANS FOR GAS-OPERATED CYLINDERS

This invention relates to fluid cylinders, and, more specifically, to means for lubricating piston-cylinder units of the type operated by gas under pressure in a closed fluid system.

In metal die forming operations it is common practice to yieldably restrain movement of the die members by means of fluid springs. Frequently such fluid springs comprise piston-cylinder units connected to a reservoir of gas under pressure, such as nitrogen. With such closed pressure systems the gas itself does not contain a lubricant, as is the case with systems wherein piston-cylinder units are operated by pressurized air supplied by a compressor and the air lines are equipped with lubricators. Thus, in closed type systems of the type to which the present invention relates, in order to reduce wear and minimize service problems auxiliary means are provided to lubricate the surfaces of the cylinder, piston and piston rod which are in sliding contact.

The present invention has for its primary object the provision of a novel lubricating arrangement for such piston-cylinder units operated by non-lubricated gas under pressure.

More specifically, the present invention contemplates the provision of an air passageway to the cylinder chamber on the side of the piston opposite that to which gas under pressure is supplied and a lubricant-impregnated material in said passageway through which the air flows. When the piston moves in the cylinder in a direction tending to create a negative pressure in said cylinder chamber, air is drawn through the passageway and lubricant becomes entrained therein so that the air/lubricant mixture flowing into the cylinder provides adequate lubrication for the surfaces of the piston, piston rod and cylinder which are in sliding contact. The arrangement of this invention also contemplates a means for prolonging the supply of lubricant to a lubricant-impregnated piston ring, such as is conventionally employed in such cylinders.

Other objects and features of the present invention will become apparent from the following description and accompanying drawings, in which:

FIG. 2 is a top view of the cylinder shown in FIG. 1;

FIG. 3 is a sectional view along the line 3—3 in FIG. 1;

FIG. 4 is a perspective view of the disc utilized in the check valves employed in the cylinder;

FIG. 5 is a fragmentary sectional view illustrating on an enlarged scale a portion of the arrangement shown in FIG. 1;

FIG. 6 is a fragmentary sectional view taken along the line 6—6 in FIG. 2;

FIG. 7 is a fragmentary view, with parts broken away, of the cylinder cap as viewed from the under side thereof; and FIG. 8 is a sectional view along the line 8—8 in FIG. 1.

Figure 1:
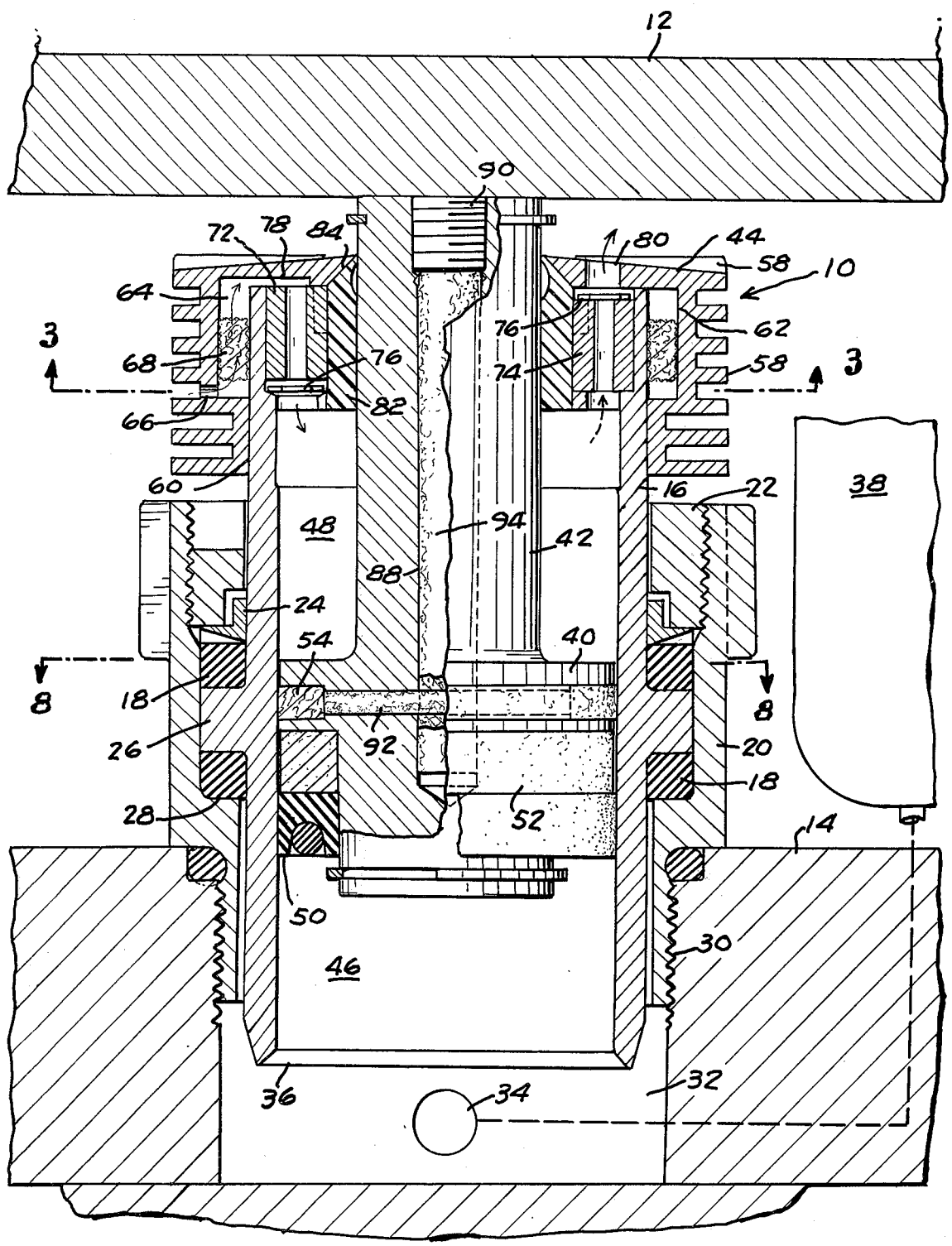
FIG. 1 is a fragmentary vertical sectional view of a fluid cylinder according to the present invention taken along the line 1—1 in FIG. 2 and illustrating the manner in which it is utilized in a die assembly.

Referring to FIG. 1, there is illustrated a fluid spring generally designated 10 in the form of a piston-cylinder unit according to the present invention which is arranged between a vertically movable die member 12 and a fixed support 14, which in the illustrated arrangement comprises a manifold plate. The overall arrangement shown in FIG. 1 is generally similar to that illustrated in my copending application Ser. No. 536,084 and now U.S. Pat. No. 3,947,005. The piston-cylinder unit 10 comprises a cylinder 16 which is mounted as by axially spaced rubber rings 18 in an outer cylindrical sleeve 20. Cylinder 16 is secured in sleeve 20 by means of a threaded clamping ring 22 which urges a metal washer 24 downwardly against the upper rubber ring 18. The two rings 18 are separated by a flange 26 on cylinder 16 and the lower ring 18 is seated on a radially inwardly extending shoulder 28 on sleeve 20. Sleeve 20 is threaded, as at 30, into a bore 32 formed in manifold plate 14. A passageway 34 connects bore 32 and thus the lower opened end 36 of cylinder 16 with a reservoir 38 containing a gas (such as nitrogen) under a predetermined high pressure. The arrangement of cylinder 16 in sleeve 20 permits the cylinder to tilt slightly relative to the central vertical axis of sleeve 20 in the event that the direction of movement of die member 12 is slightly inclined to the central axis of cylinder 16. This general arrangement is completely described in my aforesaid copending application.

Within cylinder 16 there is arranged a piston 40 to which a rod 42 is fixedly connected. Rod 42 extends upwardly through a cylinder cap 44. Piston 40 divides the interior of the cylinder into a pressure chamber 46 and an atmosphere or idle chamber 48. Piston 40 is sealed in cylinder 16 by means of a conventional annular seal 50 formed of an elastomer. The piston is also provided with a fiber wear ring 52 and a lubricant-impregnated felt ring 54.

Cap 44 is preferably formed of a metal (such as aluminum) which is a good conductor of heat. It is secured to the upper end of cylinder 16 as by a plurality of screws 56 (FIG. 6). Around its periphery and on the top side thereof cap 44 is formed with a plurality of fins such as indicated at 58. Fins 58 assist in maintaining the piston-cylinder unit at a desired low operating temperature. It will be observed that cap 44 extends radially outwardly beyond and overhangs the upper end of cylinder 16. The lower end of cap 44 is centrally bored as at 60 so as to be telescopically received over the upper end of cylinder 16. The upper portion of bore 60 is radially enlarged as at 62 to define an annular passageway 64 between the outer periphery of cylinder 16 and the inner periphery of cap 44.

As is illustrated in FIGS. 1 and 5, passageway 64 is of generally rectangular cross section. A plurality of radial openings 66 in cap 44 establish communication between annular passageway 64 and the surrounding atmosphere. Openings 66 are located between a pair of adjacent fins 58 so as to be generally shielded from oil, dirt and other foreign matter which is usually present around dies. Within passageway 64 there is arranged a member 68 which is impregnated with a lubricant such as oil. Member 68 preferably comprises a fibrous material (such as felt or the like) enclosed within a screen cloth mesh. It will be noted that annular member 68 has a vertical dimension substantially less than that of passageway 64. Furthermore, as shown in FIG. 3, the oil-impregnated member 68 does not extend completely around passageway 64; its opposed ends are spaced apart circumferentially to provide an air space 70 therebetween which is in communication with one of the radial openings 66.

Within the upper end of cylinder 16 there is arranged an inlet valve 72 and an outlet valve 74. These valves are unidirectional check valves and are oppositely oriented so that valve 72 only permits the ingress of air to chamber 48 and valve 74 only permits the egress of air from chamber 48. Each of these valves are of similar construction and include a light-weight movable valve disc 76 of cruciform shape. A disc 76 is located at the lower end of valve 72 and a similar disc 76 is located at the upper end of valve 74. Discs 76 or equivalent members are employed for unidirectional air flow through the valves in the manner of a conventional check valve. A clearance space 78 is machined on the underside of cap 44 adjacent inlet valve 72 so that the air in annular passageway 64 above the lubricant-impregnated member can flow into chamber 48 through valve 72. An opening 80 in cap 44 registers axially with the central passageway of valve 74 to permit the exhaust of air from chamber 48. The free end of piston rod 42 is guided in the cylinder by a nylon bushing 82 formed with a wiper sealing lip 84 at its upper end. In the arrangement illustrated, if desired, exhaust check valve 74 may be omitted and air permitted to escape from chamber 48 through an axial groove 86 in bushing 82 (FIG. 3).

Piston 40 and piston rod 42 are formed with a central axially extending bore 88 which is threaded at the free end of the piston rod and closed by a plug 90. Bore 88 extends downwardly to at least the plane of the felt wiper ring 54 and communicates with the annular groove in which ring 54 is seated by means of a pair of radially extending passageways 92 (FIGS. 1 and 8). Bore 88 and radial passageways 92 are filled with an oil-impregnated fibrous wick material 94.

The operation of the arrangement illustrated is clear. As shown, the free end of piston rod 42 abuts the bottom face of die member 12 and is urged upwardly thereagainst by reason of the gaseous pressure in chamber 46 which is connected by passageway 34 with reservoir 38. As die member 12 descends it causes piston 40 to move downwardly in cylinder 16, thus increasing the pressure in chamber 46 and tending to evacuate chamber 48. The tendency to create a negative pressure in chamber 48 causes air to be drawn into passageway 64 through openings 66. The bulk of this air will flow upwardly through the oil-impregnated member 68 and around passageway 64 to inlet check valve 72. Since the pressure in chamber 48 is less than in passageway 64, disc 76 assumes the position illustrated in FIGS. 1 and 5 to allow air from passageway 64 to flow through valve 72 and into chamber 48. As this air flows upwardly through member 68 oil is entrained therein and flows into chamber 48 along with the air. The oil entrained in the air thus lubricates and reduces wear on piston rod 42, the inner wall of cylinder 16 and the bore of bushing 82. In turn this will assure concentricity of the piston and piston rod within the cylinder.

As die member 12 moves upwardly the pressure of the gas in chamber 46 causes piston 40 to move upwardly, thus ensmalling chamber 48 and causing the air to be discharged therefrom through exhaust valve 74. Since at this time the pressure in chamber 48 is greater than atmospheric, valve disc 76 of valve 72 is urged upwardly to block the passageway in valve 72 and the valve disc 76 of valve 74 is urged upwardly to permit the escape of air from chamber 48. As pointed out previously, if desired, the air exhaust passageway from chamber 48 may be provided simply by the shallow groove 86 in bushing 82. In this event the sealing lip 84 at the upper end of bushing 82 will serve to prevent the ingress of a substantial amount of air to chamber 48 through passageway 86 when piston 40 descends in the cylinder.

The air gap 70 illustrated in FIG. 3 (which is defined by the space between the ends of member 68) is provided as a precautionary measure to assure the free flow of air into chamber 48 in the event that the oil-impregnated member 68 should become clogged. However, it will be noted that the provision of cap 44 and the location of passageway 64 and the inlet openings 66 are designed to prevent oil, dirt, grease and other foreign matter which are invariably present around dies from being drawn into passageway 64. It will also be apparent from the foregoing description that the oil-impregnated wick member 94 provides a prolonged supply of oil to the felt ring 54 which eliminates the necessity of frequent servicing and replacement of ring 54. However, servicing of cylinder 16 is relatively simply since the valves and the oil-impregnated member 68 are readily accessible by loosening screws 56 and removing cap 44 from the upper end of the cylinder.

I claim:

1. In combination a cylinder, a piston movable axially in the cylinder and dividing the cylinder into a working chamber and an idle chamber which vary inversely in size in accordance with movement of the piston axially in the cylinder, means communicating said working chamber with a source of pressurized gas and permitting said gas to flow into and out of said working chamber, passageway means establishing communication between the surrounding atmosphere exteriorly of said cylinder and said idle chamber and permitting the flow of air into and out of said idle chamber, and air permeable means in at least one section of said passageway means impregnated with a lubricant, said air permeable means being disposed so that air flowing through said one section of said passageway means into said idle chamber is directed into intimate contact with said lubricant to entrain the lubricant in said air, whereby said piston and the internal walls of said idle chamber are lubricated by the lubricant entrained in the air flowing into said idle chamber.

2. The combination called for in claim 1 wherein said passageway means includes an inlet passageway in which said lubricant impregnated means is disposed and an exhaust passageway for exhausting air from said idle chamber back into the surrounding atmosphere and means in said inlet passageway preventing flow of air therein from said idle chamber to the surrounding atmosphere.

3. The combination called for in claim 1 wherein said passageway means comprises an inlet passageway and including orifice means connecting said inlet passageway and said idle chamber to permit the flow of air therethrough into said idle chamber in response to a pressure differential in said passageway resulting from enlarging of the idle chamber as the piston moves toward one end of the cylinder and preventing flow of air out of said idle chamber through said inlet passageway in response to contraction in the size of the idle chamber.

4. The combination called for in claim 1 wherein said air permeable means comprises a porous wick.

5. The combination called for in claim 4 wherein said wick is impregnated with oil.

6. The combination called for in claim 1 wherein said passageway means extends at least in part circumferentially around said cylinder.

7. The combination called for in claim 6 including a plurality of circumferentially spaced openings in the circumferentially extending portion of said passageway means communicating with the surrounding atmosphere exteriorly of said cylinder.

8. The combination called for in claim 7 wherein said air permeable means extends throughout at least a major extent of the circumferentially extending portion of the passageway means.

9. The combination called for in claim 8 wherein said air permeable means has circumferentially spaced parted ends, one of said openings registering with the space between said parted ends, said space communicating directly with said idle chamber rather than through said lubricant-impregnated means.

10. The combination called for in claim 1 including a piston rod connected to said piston and extending axially through said idle chamber, means defining a wall adjacent the end of the idle chamber opposite the piston, said end wall having a bore therein, said piston rod extending through said bore with a close fit whereby the lubricant/air mixture in said idle chamber lubricates said piston rod and bore.

11. The combination called for in claim 10 including a central bore extending axially in said piston rod, a lubricant-impregnated material in said bore, said piston having a lubricant-impregnated ring extending circumferentially around the piston and engaging the side wall of the cylinder, and means forming a radially extending passageway establishing communication between said central bore and said ring.

12. The combination called for in claim 11 including a lubricant-impregnated material in said radially extending passageway.

13. The combination called for in claim 1 including a unidirectional valve in said one section of said passageway means for admitting air to said idle chamber.

14. The combination called for in claim 13 including a second unidirectional valve in another section of said passageway means for permitting air to escape from said chamber in response to contraction in size of the idle chamber as a result of axial movement of said piston in said cylinder.

15. The combination called for in claim 13 wherein another section of said passageway means comprises an exhaust passageway extending from said idle chamber to the surrounding air, said exhaust passageway being restricted in size relative to said one section of said passageway means to minimize the flow of air into said idle chamber through said exhaust passageway.

16. The combination called for in claim 1 including a piston rod connected to said piston and extending axially through said idle chamber and the adjacent end of the cylinder, an annular cap on said end of the cylinder through which the piston rod extends, said cap having a peripheral skirt which extends circumferentially around and overhangs the outer periphery of said cylinder at said one end thereof, said passageway means being defined at least in part by said overhanging skirt.

17. The combination called for in claim 16 wherein said passageway means extends circumferentially around the cylinder within the axial extent of the overhanging skirt.

18. The combination called for in claim 17 wherein the circumferentially extending portion of said passageway means extends axially in a direction toward said end of the cylinder, said passageway means then extending radially inwardly beyond the inner periphery of the cylinder wall and then axially toward said piston into said idle chamber.

19. The combination called for in claim 18 wherein said lubricant-impregnated means is disposed in the circumferentially extending portion of said passageway.

20. In a die assembly of the type which includes a support, a die member movable toward and away from said support, and a fluid spring extending between said die member and said support, said fluid spring comprising a piston movable axially within a cylinder and having a piston rod extending through an end wall of the cylinder so that when a gas under sufficient pressure is directed to the end of the cylinder opposite the rod end thereof the rod and cylinder apply forces to the support and die member which tend to move them relatively away from one another and when the force on the die member is sufficient it overcomes the pressure in the end of the cylinder opposite the rod end thereof and causes the piston to move in a direction away from the rod end thereof and causes said die member and support to move relatively toward one another, the improvement which comprises, a passageway for admitting air from the surrounding atmosphere into the rod end of the cylinder in response to movement of the piston in a direction away from the rod end of the cylinder, and lubricant-impregnated, air permeable means in said passageway, said lubricant being of the type which is adapted to be entrained in the air flowing into the rod end of the cylinder through said passageway to thereby lubricate the piston, the piston rod and the interior walls of the cylinder.

21. The combination called for in claim 20 including valve means in said passageway for admitting air to the rod end of the cylinder in response to movement of the piston axially in a direction away from the rod end of the cylinder.

22. The combination called for in claim 21 including an exhaust passageway extending from the rod end of the cylinder to the surrounding atmosphere for discharging air from the rod end of the cylinder when the piston moves axially in a direction toward the rod end of the cylinder.

23. The combination called for in claim 22 including an annular cap extending over the rod end of the cylinder and having an axially extending skirt thereon which overhangs the outer periphery of the cylinder, said passageway being defined at least in part by said cap.

24. The combination called for in claim 23 wherein said passageway extends circumferentially between the side wall of the cylinder and the overhanging skirt of the cap.

25. The combination called for in claim 24 wherein said lubricant-impregnated means is disposed within the circumferentially extending portion of said passageway.

26. The combination called for in claim 25 wherein said passageway communicates with the surrounding air through a plurality of circumferentially spaced air inlet openings around said cap.

27. The combination called for in claim 26 wherein said air inlet openings are radially oriented.

28. The combination called for in claim 27 wherein said skirt is provided with a plurality of axially spaced, radially outwardly extending fins thereon, said air inlet openings being located between a pair of adjacent fins.

29. The combination called for in claim 20 wherein the end of the cylinder opposite the rod end thereof is connected with a reservoir charged with gas under pressure.

30. The combination called for in claim 20 wherein said piston rod has an axially extending passageway therein, said piston having a lubricant-impregnated ring thereon contacting the wall of the cylinder, a passageway in said piston extending radially outwardly from said axial passageway in the piston rod to said ring and a lubricant-impregnated material in the passageways in said rod and piston.

* * * * *